May 6, 1969  M. BEAULIEU  3,443,187
SYSTEMS FOR REGULATING THE SPEED OF DIRECT-CURRENT
MOTORS AND APPLICATIONS THEREOF
Filed Jan. 19, 1966

United States Patent Office 3,443,187
Patented May 6, 1969

3,443,187
SYSTEMS FOR REGULATING THE SPEED OF DIRECT-CURRENT MOTORS AND APPLICATIONS THEREOF
Marcel Beaulieu, 60 Rue Auguste-Comte, Fontenay-Sous-Bois, Val-de-Marne, France
Filed Jan. 19, 1966, Ser. No. 521,642
Claims priority, application France, Jan. 29, 1965, 3.810
Int. Cl. H02p *5/06;* H02k *27/20*
U.S. Cl. 318—327         1 Claim

ABSTRACT OF THE DISCLOSURE

Speed-regulating system for direct-current motors which are supplied from a direct-current source and suitable for use in mechanisms of the class of motion picture cameras phonograph turntables and tape recorders, comprising an electromechanical generator for producing a regulating current characterized in that the D.C. motor is positively coupled to an electromechannical current generator whose voltage is a function of the speed of the motor and controls an electronic relay which is inserted in the motor supply circuit, the arrangement being such that the motor supply current is an inverse function of the speed of the motor.

---

It is known that, at the present time, the speed of rotation of D.C. motors, especially fractional horse-power motors and motors employed in self-powered, battery-operated units such as electrically driven motion picture cameras, portable tape recorders and the like, is usually regulated by a centrifugal governor which cuts off (either totally or partially) the supply of current to the motor as soon as this latter exceeds a predetermined speed and again restores the supply current as soon as the motor slows down.

The current is cut off and restored either directly by means of contacts or by means of a transistor switching system which avoids the arcing caused by the separation of contacts.

The main disadvantage of this system of regulation by centrifugal governor lies in the fact that said governor only operates in respect to a predetermined speed whereas, in the majority of cases, the apparatus which is equipped with the motor calls for a number of different speeds.

A further disadvantage of this system which is no less important than the first lies in the fact that the motor operates on the "all or none" principle, with the result that the speed of the motor is not constant but continuously oscillates between the value which corresponds to the separation of the contacts (or opening of the transistor switch) and a value corresponding to the closure of said contacts (or of said transistor switch system).

It has already been sought to circumvent this disadvantage by stabilizing the speed of the motor in apparatuses of the type hereinabove referred to, either by associating the D.C. motor (main motor) with an auxiliary synchronous fractional horsepower motor having a rotor which is keyed on the shaft of the main motor and supplied with current by means of a small oscillator which is in turn fed from the local current source, or by replacing the D.C. motor by a main synchronous motor which is supplied by a local oscillator.

However, the solutions mentioned above have proved in practice to be heavy, cumbersome, delicate and costly. Furthermore, they do not eliminate the disadvantage of the single speed, and are subject to a further disadvantage in regard to stabilization of the frequency of oscillators.

The object of the present invention is to circumvent the disadvantages of the different solutions hereinabove set forth by virtue of a speed-regulating system which is of lightweight construction, of simple and compact design, inexpensive to produce and highly reliable in operation. In addition, the system herein contemplated has the advantage of affording continuous speed regulation between a minimum value (for example 200 r.p.m.) and a maximum value, namely the maximum speed at which the motor is designed to rotate.

The invention is specially characterized in that the D.C. motor is positively coupled to an electromechanical current generator whose voltage is a function of the speed and controls a progressive electronic relay which is inserted in the motor supply circuit, the arrangement being such that the motor supply current is an inverse function of the speed of said motor.

In a preferred form of embodiment, the invention is further characterized by the following features and combinations thereof:

The rotor of the electromechanical current generator is keyed on the shaft itself of the motor;

The electromechanical current generator is a tachometer dynamo;

In an alternative form, the electromechanical current generator consists of an alternator combined with a rectifier;

The progressive electronic relay is an electronic rheostat;

The electronic rheostat is a transistor connected in series with the motor;

The transistor (which forms an electronic rheostat) is controlled by the electromechanical current generator by way of a D.C. amplifier;

The D.C. amplifier is a transistor amplifier;

The transistor amplifier is supplied with current from the same source as the motor;

The speed of the motor is regulated by means of a potentiometer inserted between the electromechanical current generator and the amplifier, the terminals of the potentiometer resistance being connected to the terminals of said generator whilst the sliding contact of the potentiometer which forms the speed-controlling member is connected to the input of said amplifier.

In the novel speed-regulating system, the voltage which is developed at the terminals of the electromechanical current generator is compared with a reference voltage. If the voltage of the generator is higher than the reference voltage (in which case the speed of rotation of the motor is too high) the internal resistance of the transistor which is series-connected with the motor increases, thereby causing the motor to slow down. The reverse process takes place when the voltage of the generator is lower than the reference voltage.

Further particular features and characteristics of the invention will be brought out by the following description which relates to one example of practical application of the invention as given without implied limitation and represented diagrammatically in the accompanying drawings, in which.

Figure 1:
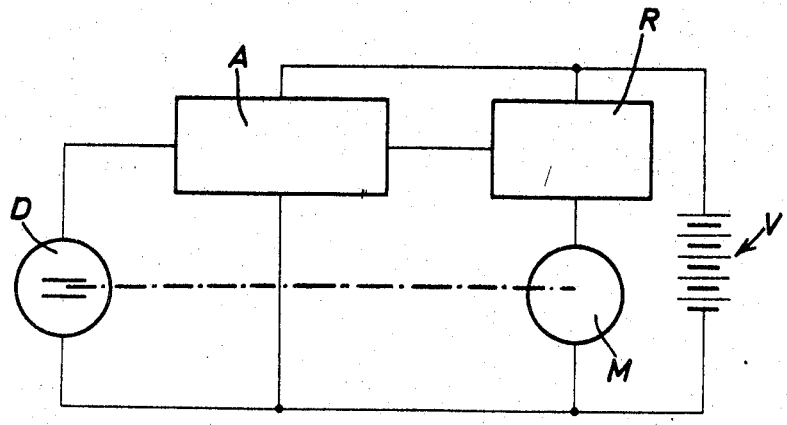
FIG. 1 is a schematic diagram of the novel speed-regulating system.

The general means which forms the basis of this invention comprise, as shown in FIG. 1, a tachometer dynamo D which is driven by the D.C. motor M and the terminals of which are connected to the input of an amplifier A connected to an electronic rheostat R which is controlled by said amplifier and the controlled elements of which are in turn connected in series with the motor M, the same current source V being employed to feed the amplifier A, on the one hand, and the series-connected assembly R—M, on the other hand.

Figure 2:
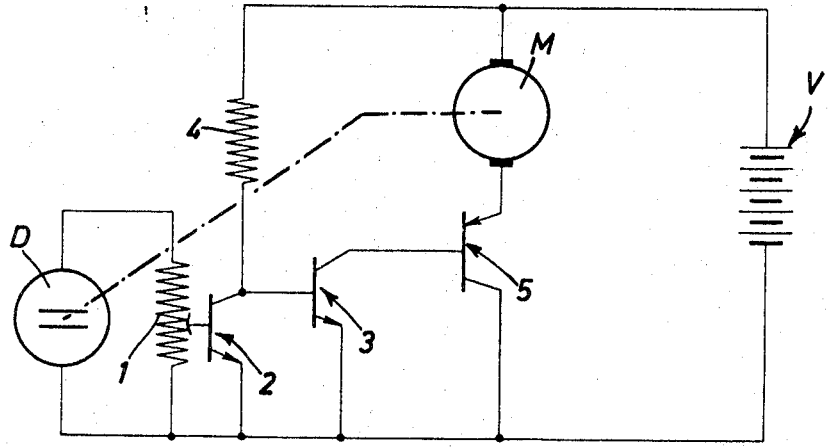
FIG. 2 is a diagram of a practical form of arrangement of the electric circuits and elements of the system.

In the practical form of embodiment which is shown in FIG. 2, the dynamo D (the rotor of which is keyed on the shaft of the motor M which is supplied with current from the source V) is connected to the terminals of the resistance of the potentiometer 1, the sliding contact of which is connected to the base of an n-p-n transistor 2.

The emitter of the transistor 2 is connected to the negative pole of the current supply source V, whilst the collector of said transistor is connected, on the one hand, directly to the base of a transistor 3 which is also of the n-p-n type and, on the other hand, via the resistance 4, to the positive pole of the current source V.

The emitter of the transistor 3 is connected directly to the negative pole of the current source V, whilst the collector of said transistor is connected to the base of the p-n-p transistor 5, the collector of which is connected to the negative pole of the current source V and the emitter of which is connected to one of the two terminals of the motor M, the other terminal of which is connected to the positive pole of said current source.

The voltage of the dynamo D which is brought back to the appropriate value by the potentiometer 1 is compared with the base-emitter voltage of the transistor 2. If the voltage of the dynamo is lower than a predetermined value of said base-emitter voltage (transistor 2), or in other words, if the motor M has slowed down, the collector current of the transistor 2 decreases and the voltage drop across the resistor 4 decreases accordingly.

As a consequence, the base-emitter voltage of the transistor 3 increases, thereby also increasing the collector current of said transistor.

The above-mentioned increase in the collector current of the transistor 3 produces the increase in the base current of the transistor 5, the conductivity of which also increases. Consequently the motor is supplied with a current of higher intensity and its speed increases.

The reverse process takes place in the case of an increase in the voltage developed across the terminals of the dynamo, that is to say when the motor rotates at a speed which exceeds that which has been set as a result of the adjustment of the potentiometer 1.

It is apparent that the form of embodiment of the speed-regulating system which has been described in the foregoing and illustrated in the accompanying drawings is given solely by way of example and that any detail modification can be made in the arrangements which have been contemplated without thereby departing either from the scope or the spirit of the invention, which also extends to the novel industrial product which is provided by any apparatus or device such as a motion picture camera, tape recorder and the like which entails the application of the speed-regulating system hereinabove described.

I claim:

1. Speed-regulating system for direct-current motors which are supplied from a direct-current source and suitable for use in mechanisms of the class of motion picture cameras, phonograph turntables and tape recorders, comprising an electromechanical generator for producing a regulating current and having a rotor which is positively coupled with said motor in order that the voltage of said generator should be a function of the speed of the motor, an electronic rheostat for said motor formed by a transistor having an output circuit which is connected in series in the motor circuit, a D.C. amplifier which is connected to said transistor and controlled by the regulating current generator, and a potentiometer which is inserted between the regulating current generator and the amplifier, the terminals of the potentiometer resistance being connected to the terminals of said regulating current generator, whilst the sliding contact of the potentiometer, which forms the speed control member, is connected to the input of said amplifier.

References Cited

UNITED STATES PATENTS

| 2,809,338 | 10/1957 | Carlson | 318—345 X |
| 3,166,703 | 1/1965 | Mintzer | 318—327 |
| 3,233,163 | 2/1966 | Mishima | 318—327 |
| 3,335,350 | 8/1967 | Persson | 318—327 |
| 3,381,199 | 4/1968 | Persson | 318—327 |

ORIS L. RADER, *Primary Examiner.*

H. HUBERFELD, *Assistant Examiner.*

U.S. Cl. X.R.

318—345